Jan. 5, 1971 G. FANTONI 3,551,974
TOOL CLAMPING DEVICE FOR TOOL STORAGE MAGAZINE OF MACHINE TOOL
Filed July 29, 1968 3 Sheets-Sheet 1

INVENTOR
GIUSEPPE FANTONI

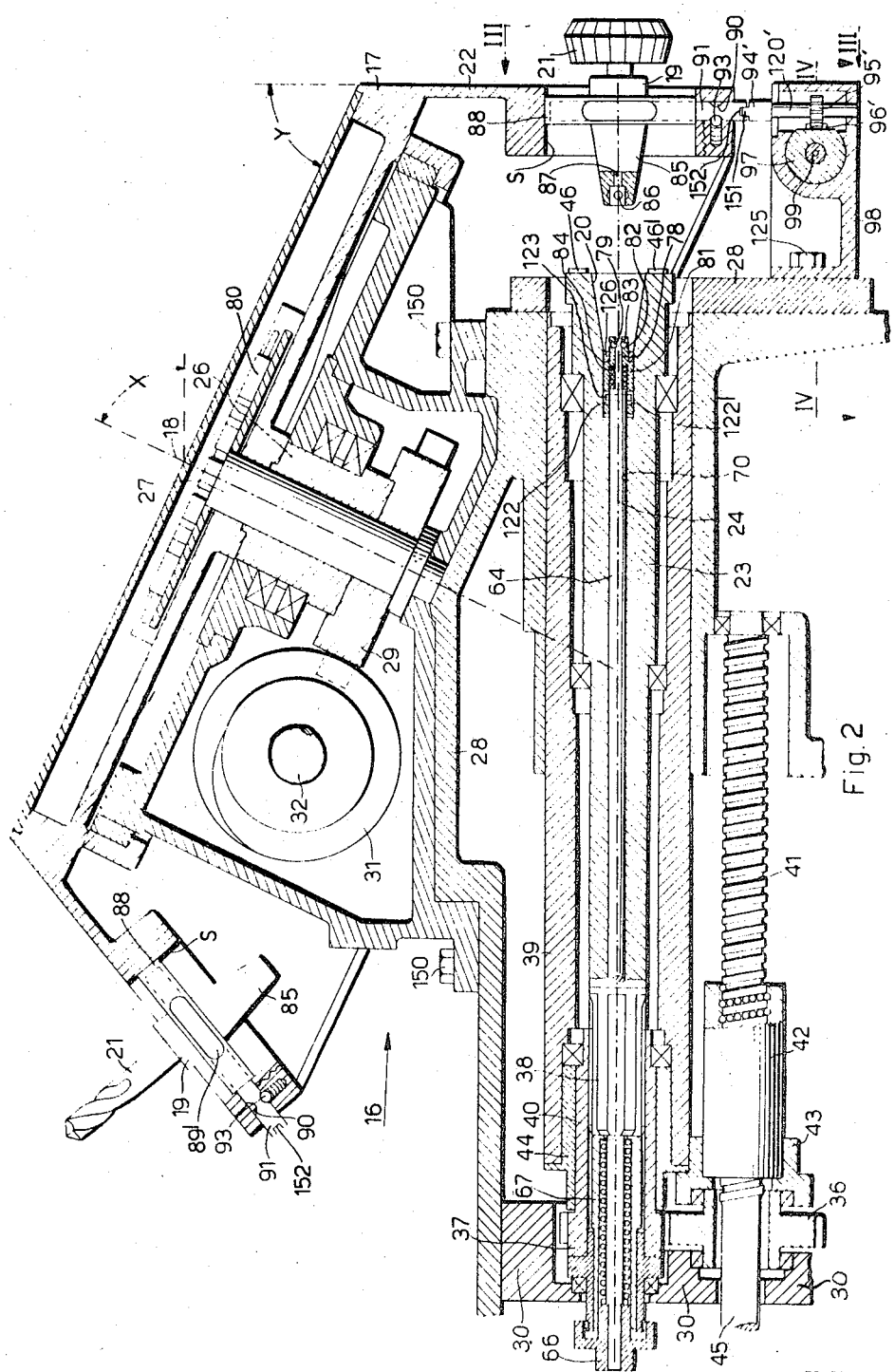

*INVENTOR.*
GIUSEPPE FANTONI

United States Patent Office 3,551,974
Patented Jan. 5, 1971

3,551,974
TOOL CLAMPING DEVICE FOR TOOL STORAGE MAGAZINE OF MACHINE TOOL
Giuseppe Fantoni, Ivrea, Torino, Italy, assignor to Ing. C. Olivetti & C., S.p.A., Ivrea, Torino, Italy, a corporation of Italy
Filed July 29, 1968, Ser. No. 748,535
Claims priority, application Italy, July 29, 1967, 52,600/67
Int. Cl. B23b *39/00;* B23c *1/02*
U.S. Cl. 29—26                                 6 Claims

ABSTRACT OF THE DISCLOSURE

A machine tool arrangement having a device for locking tools thereto comprising a chuck, a magazine adapted to accommodate a series of tools selectively connectable to the chuck by individual tool holders, and a mechanism for moving the magazine to bring the selected tool into the tool changing position. Each tool carrier is normally locked to the magazine, but may be selectably disengaged therefrom for coupling to the chuck.

CROSS REFERENCE TO RELATED APPLICATION

Applicant claims priority from corresponding Italian patent application Ser. No. 52,600/67, filed on July 29, 1967.

BACKGROUND OF THE INVENTION

Field of the Invention

The invention relates to a machine tool for effecting rapid tool changes according to a predetermined sequence between a plurality of different tools. In particular, locking means are disclosed to normally lock each tool through a tool carrier to the magazine and to cause disengagement of selected tools from the magazine for coupling to a chuck when it is desired to use said selected tool.

Description of the prior art

The prior art discloses machine tools wherein a plurality of tools are held in a magazine for selective operation on a workpiece. Generally, in known machine tools, the individual tools are generally held in the magazine by resilient means which are unreliable and have low wear resistance characteristics.

For example, in one known machine the tools are held in the magazine by means of slideable jaws that are simultaneously movable in opposite directions. The jaws are held closed by a spring and are opened by means of an electromagnet. This arrangement requires the utilization of expensive and complicated arrangements.

SUMMARY OF THE INVENTION

These and other defects of prior art machine tools having locking devices to selectively lock and disengage individual tools associated with the magazine are solved by the present invention. The machine tool arrangement disclosed herein has a locking device for locking tools in a machine tool comprising a chuck, a magazine adapted to accommodate a series of tools each of which has an individual tool carrier for selective connection thereof to the chuck, and positioning means for selectively positioning the magazine to bring a selected tool within the tool changing position for connection to the chuck.

Each tool carrier is normally locked to the magazine by the locking device. The locking device as disclosed according to the invention comprises a pair of bars normally engaging two corresponding grooves formed diametrically opposite each other on the lateral surface of each tool carrier. The bars are provided with recesses corresponding to the grooves and are rotatable through a predetermined angular distance in order to permit disengagement of the tool carriers from the magazine. Thus in one position the bars lock the tool carriers to the magazine, and in a second position corresponding to the positioning of the selected tool within the tool changing position, the bars disengage the tool carrier from the magazine to permit coupling of the tool carrier and hence the tool to the chuck.

BRIEF DESCRIPTION OF THE DRAWINGS

FIG. 2 is a part sectional view of the machine of FIG. 1 taken along section lines II—II of FIG. 1;

DETAILED DESCRIPTION OF THE INVENTION

Figure 1:
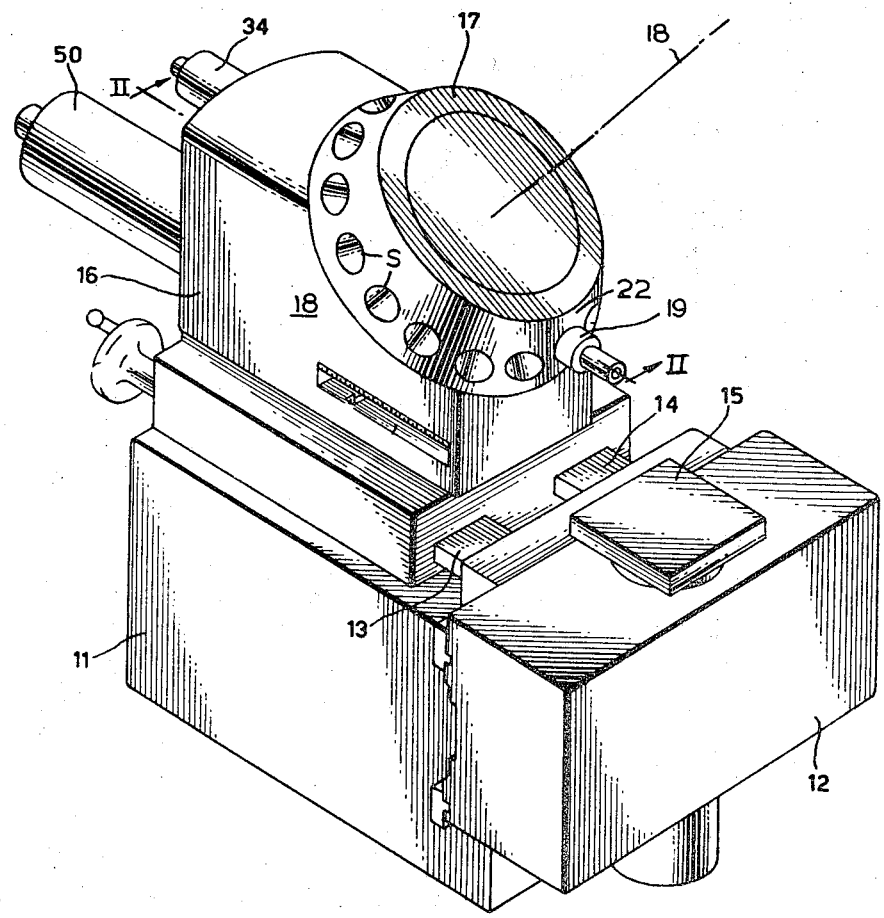
FIG. 1 is a left front perspective view of a machine tool arrangement that may be used in conjunction with the locking device disclosed according to the invention.

Referring to FIG. 1, the machine comprises base 11 mounted on carriage 12 which is movable in the transverse direction, and workpiece table 15 which is rotatable and vertically adjustable. The movements of carriage 12 and table 15 may be controlled by a conventional control system having a program recorded on punched or magnetic tape, for example.

Prismatic guides 13 and 14 upon which headstock 16 is free to slide are affixed to base 11. Headstock 16 carries a tool-magazine secured thereto by screws 150 (FIG. 2). The tool-magazine comprises truncated cone-shaped drum 17 which is revolvable about its axis 18. Drum 17 revolves about headstock 16 which is nonrotatable with respect to base 11. Drum 17 contains a plurality of cells or seats S to hold a series of tool-carriers 19, each of which carries a particular associated tool 21 projecting radially from lateral surface 22 of the drum.

As shown in FIG. 2, headstock 16 also comprises horizontal chuck 23 rotatable about is longitudinal axis 24. Axis 18 of drum 17 is inclined towards axis 24 of chuck 23 at an angle X which is equal to the angle Y formed by the generatrix of the truncated cone-shaped drum 17 with either of its bases. Therefore when the drum turns, it aligns the various tools with the axis of chuck 23, according to a predetermined sequence determined by the selected program.

Drum 17 is integral with sleeve 26, the latter being rotatable on shaft 27 which is fixed to frame 28 of headstock 16. Sleeve 26 is also integral with worm wheel 29 that engages with worm 31 mounted by rotatable shaft 32 on frame 28. The gear transmission ratio between worm 31 and wheel 29 is such that for each revolution of shaft 32, wheel 29 causes drum 17 to turn an amount equal to the angular distance between two adjacent tools. As best seen in FIG. 1, the tool seats S are equal angularly spaced about drum 17. Accordingly, the gear ratio between worm 31 and wheel 29 is determined by the number of tool seats, for example, if there are 12 tool seats one revolution of worm 31 must result in 1/12 revolution of drum 17, the ratio would then be 12 to one in the example chosen. The drum thereby advances by one tool interval for each revolution of shaft 32. Rotation of shaft 32 for the purpose of tool selection may be effected under the control of a set of switches 80 in the manner described in U.S. patent application Ser. No. 576,459, filed Aug. 31, 1966 by Giorgio Ollearo, now Pat. No. 3,473,419. Switches 80 correspond to the switches indicated by numeral 44 in the patent.

The mechanism for controlling rotation of chuck 23 comprises gear wheels 36 and 37, the latter having cylindrical extension 40 which is splined internally to engage with complementary splined portion 38 of chuck 23. Chuck 23 is rotatably mounted by means of bearings within sleeve 39. The wheels 36 and 37 are mounted by means of bearings on a support 30 which is slideable in the axial direction in housing 28.

The control transmission for the advancement and return of slideable sleeve 39 comprises screws 41 and nut 42 containing balls, fixed by means of collar 43 and sleeve 44 to sleeve 39. Particularly the collar 43 is adapted to directly urge sleeve 39 forwardly (right in FIG. 2). Whereas the plate 30 is provided with a projection, not shown in FIG. 2, to urge the sleeve 39 rearwardly when displaced by the collar 43. Screw 41 is operated through shaft 45 by motor 50 mounted on headstock 16, as shown in FIG. 1. Gear 36 is journalled loose for free mounting on shaft 45. Cylindrical extension 40 of gear 37 is rotatably received within sleeve 44.

Figure 5:
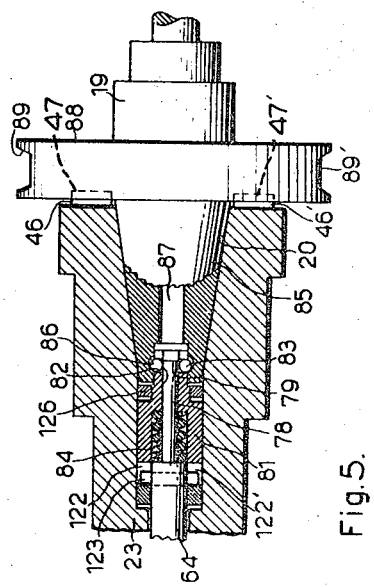
FIG. 5 is a sectional view on a larger scale of a detail of FIG. 2.

As shown in FIGS. 2 and 5, the front end of chuck 23 has radial keys 46 and 46' that fit into corresponding slots 47 and 47', respectively, which are provided on each tool-holder 19 for the purpose of coupling the latter to chuck 23. To insure accurate and reliable keying of the radial keys into their corresponding slots, a positioning unit is operatively associated with chuck 23. This may be of the type disclosed in the copending application Ser. No. 748,534, filed July 29, 1968, by Bruno Antonietto et al. entitled Tool Change Device for a Machine Tool, assigned to the same assignee as this invention. However, such a chuck positioning device forms no part of this invention.

Figure 6:
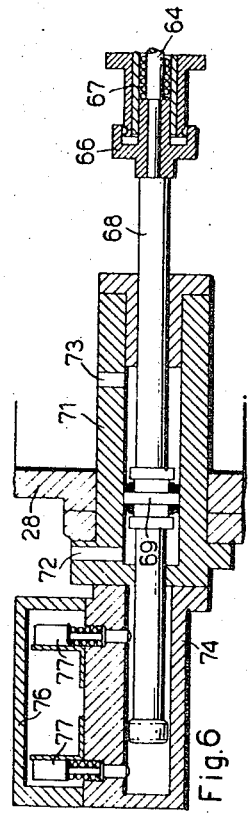
FIG. 6 is a longitudinal partial sectional view of the machine of FIG. 1 also taken along section lines II—II.

Chuck 23 has an axial bore 70 in which rod 64 is slidable. The rear end of rod 64 is integral with cap 66. Piston 69 (FIG. 6) is slideable in hydraulic cylinder 71 which is integral with housing 28, and has ports 72 and 73 for the admittance and release of fluid. It is provided with piston rod 68 which normally acts on cap 66 under the force of fluid admitted by port 72 to hold the cap resiliently in an advanced position against the force of compression spring 67 positioned between collar 126 of rod 64 and splined portion 38 of chuck 23. Piston rod 68 of piston 69 is extended on the side remote from head 66 and slides in cylinder 74. Casing 76, containing limit switches 77 and 77' which are engaged by the end of rod 68 to arrest the stroke of piston 69, is affixed to cylinder 74.

As shown in FIGS. 2 and 5, each tool carrier comprises a conical tail 85 for selective receipt by conical recess 20 which is formed at the end of chuck 23. In the area of recess 20, rod 64 has a terminal portion 78 of reduced diameter defining radial recesses 79 on its extended surface (FIG. 5). Terminal portion 78 is contained in a hollow bushing 81, the wall of which forms seats 82 for receipt of corresponding small balls 83. Bushing 81 has recesses 122 and 122' in which pin 123, affixed to shaft 64, is positioned. Compression spring 84 located between a shoulder of bushing 81 and rod 64 normally holds the bushing against ring 126 which is screwed to chuck 23. Balls 83 are thereby positioned in seats 82 (FIG. 5). The balls are operative to emerge partially from seats 82 of bushing 81 and enter corresponding recesses 86 formed in the internal surface of bore 87 of tail 85 of the tool carrier 19 as shown in FIG. 5.

Figure 3:
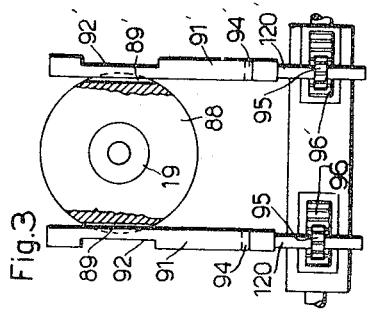
FIG. 3 is a sectional view of the machine of FIG. 1 taken along section lines IV—IV of FIG. 2.

Still considering FIG. 5, each tool carrier 19 is also provided with a collar 88 which contains grooves 89 and 89' in diametrically opposite positions. As shown in FIG. 3, bars 91 and 91', respectively, cooperate with grooves 89 and 89'. It should be realized that grooves 89 and 89' as shown in FIG. 3 are rotated 90° from the position in which they are shown in FIG. 5. Bars 91 and 91' recesses 92 and 92' which cooperate with grooves 89 and 89', respectively. The bars are rotatable about their vertical axes and, when positioned as in FIG. 3, lock collar 88 against rotation. When both bars are rotated 180°, they disengage from grooves 89 and 89' of collar 88 and allow the collar to rotate. FIG. 2 shows that each bar is held in position on drum 17 by a spring loaded detent ball 93 which engages in one of a pair of notches 90 formed in each bar. As shown in FIG. 3, bars 91 and 91' can be engaged by means of complementary coupling members 94 and 94' with shafts 120 and 120' carrying pinions 95 and 95', respectively. Each coupling member (94, for example) is in the form of a tongue 151 on the corresponding shaft 120, which slides into a slot 152 defined at the bottom of the associated bar 91. In all rest positions corresponding tongues and slots are aligned as shown in FIG. 2. Obviously corresponding tongues and slots could be interchanged.

Figure 4:
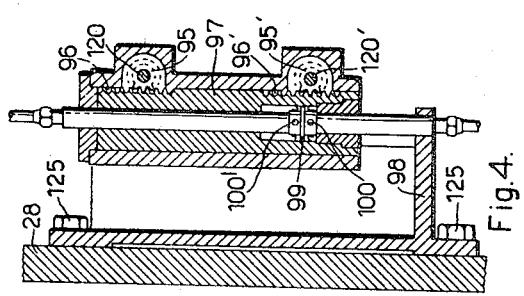
FIG. 4 is a sectional view of the machine of FIG. 1 taken along section lines V—IV of FIG. 2.

Pinions 95 and 95' engage with racks 96 and 96', respectively, formed on the outer surface of double-acting hydraulic cylinder 97 (FIG. 4). Cylinder 97 is slideable in support 98 which is fixed to the housing by means of bolts 125. The piston rod of piston 99 accommodated in cylinder 97 is fixed to support 98 and has an axial bore for the passage of fluid which can enter cylinder 97 by means of radial ports 100 and 100' formed in piston 99 on opopsite sides of the piston head.

The operation of the machine is as follows:

Drum 17 is rotated to select the desired tool, by rotating shaft 32, worm 31, worm wheel 29, sleeve 26 and hence the drum until the required tool is in alignment with the chuck 23. The chuck is then appropriately oriented in such manner that keys 46 and 46' of chuck 23 may enter recesses 47 and 47', respectively, in the selected tool carrier 19 (FIG. 5). The orientation of the chuck or spindle may be effected, for example, as described in the copending patent application Ser. No. 748,534, identified above.

The new tool is then coupled to chuck 23 by causing motor 50 to rotate shaft 45 and hence screw 41, the corresponding nut 42 of which shifts sleeve 39 forwardly together with gear wheels 36 and 37 until chuck 23 is brought over the new tool carrier 19. Under the control of fluid admitted through port 72 (FIG. 6), piston 69 follows chuck 23 and holds rod 64 in the position, relative to the chuck, shown in FIG. 5.

Fluid then enters cylinder 71 (FIG. 6) through port 73 and causes piston 69 to perform a complete rearward stroke, thereby disengaging it from head 66 of rod 64 which is then forced rearwardly by spring 67. Rod 64, when retracting, shifts pin 123 in recesses 122 and 122', whereby portion 78 withdraws recesses 79 from balls 83. The balls are thus forced radially outwards and are received by recesses 86 in bore 87. The selected tool carrier 19 thereby becomes locked to chuck 23.

Fluid is then admitted through duct 100 into cylinder 97 (FIG. 4) which is thereby moved downwardly causing rotation of pinions 95 and 95' and shafts 120 and 120' through 180° in anti clockwise direction. Shafts 120 and 120', through coupling members 94 and 94' (FIG. 3), thereby cause rotation of bars 91 and 91', respectively, of the tool carrier 19 locked to chuck 23, said bars being coupled to their respective shafts 120 and 120' when drum 17 brings the selected tool into alignment with chuck 23. Bars 91 and 91' then present recesses 92 and 92' (FIG. 3) to grooves 89 and 89' respectively, whereby the tool carrier is unlocked from drum 17.

Chuck 23 is then rotated together with the tool carrier through gear wheels 36 and 37 by motor 34 mounted on headstock 16. Simultaneously screw 41 is again rotated at a speed corresponding to the required speed of advance of the selected tool to thereby effect the required operation on the workpiece, the chuck 23 is axially moved through the seat S to drive the engaged tool for operation on the workpiece. The control mechanism for rotation of chuck 23 may comprise a shaft engaged by a gear wheel operated by motor 34, as shown in FIG. 1.

When the operation is completed, the rotation of screw 41 is reversed so as to withdraw chuck 23 until recesses 89 and 89' are brought into the plane of bars 91 and 91', respectively. Then the chuck 23 is again angularly positioned in the manner described in the cited application Ser. No. 748,534, so as to face the recesses 89 and 89' to the bars 91 and 91'. Fluid is then admitted to cylinder 97 (FIG. 4) by duct 100', whereby cylinder 97 returns to the position shown causing bars 91 and 91' to rotate through 180°. Tool carrier 19 is thus locked again to drum 17.

Thereupon fluid is again admitted to cylinder 71 by port 72 (FIG. 6) whereby piston 69 is shifted forwardly by its maximum stroke. Piston rod 68 then acts on head 66 of rod 64, which is again positioned in the forward position together with chuck 23. Rod 64 is thus positioned forwardly within chuck 23 by a small amount relative to bushing 81 (FIG. 2). Pin 123 on rod 64 then pushes the bushing 81 until it abuts against ring 126. In this movement, portion 78 of rod 64 brings recesses 79 back into registration with balls 83 and the latter can then move radially inwardly.

By now rotating screw 41 again, sleeve 39 is returned rearwardly whereby chuck 23 and rod 64 are separated from the tool carrier 19. During this movement, head 66 of rod 64 returns piston rod 68 partially backwards, whereby the machine returns into the initial position described above and is ready for the selection of a new tool.

What is claimed is:

1. A machine tool arrangement having a plurality of tool holders wherein a selected one of said tool holders may be rapidly and selectively positioned in the proximity of a workpiece according to a predeterminated sequence, and including a magazine having a plurality of cells each adapted to receive one of said tool holders, means for selectively moving said magazine to bring a predetermined tool holder in a tool changing station, and means for connecting the selected tool holder with a chuck, the improvement comprising: a pair of grooves arranged at diametrically opposite locations on each of said tool holders, a pair of cylindical bars rotatably mounted on each of said cells and normally engaging said grooves to lock said tool holder into one of said cells, each of said bars including a recess; means for rotating said bars, rotation of said bars effecting the adjacent positioning of said recesses to said grooves so that said tool holder is free to rotate when said bars are rotated so that said bars rotate simultaneously when said means for rotating is actuated; coupling means for coupling said bars to said means for rotating so that said bars rotate simultaneously when said means for rotating is actuated.

2. The machine tool arrangement of claim 1, further including: a pair of balls located in each of said cells, and depressions in each of said bars adapted to receive said balls to hold said bars in a position to lock one of said tool holders in one of said cells and to release said one tool holder when said balls are free of said depressions.

3. The machine tool arrangement of claim 1, wherein said coupling means includes a slot formed in one end of each of said bars and a tongue provided at one end of a corresponding shaft rotatably mounted on said machine, said slots being normally engageable with said tongues when said tool holder is positioned near said workpiece in said station, a pinion secured to each of said shafts, and a rack engaging said pinions and reciprocable to rotate said shafts 180 degrees.

4. The machine tool arrangement of claim 3, wherein said rack is formed on one side of a hydraulic cylinder, means for slidably mounting said cylinder on said machine, and a stationary piston cooperating with said cylinder for hydraulically reciprocating said cylinder.

5. The machine tool arrangement of claim 2, where said coupling means include a slot formed in one end of each of said bars and a tongue provided at one end of a corresponding shaft rotatably mounted on said machine, said slots being normally engageable with said tongues when said tool holder is positioned near said workpiece in said station, a pinion secured to each of said shafts, and a rack engaging said pinions and reciprocable to rotate said shafts 180 degrees.

6. The machine tool arrangement of claim 5 wherein said rack is formed on one side of a hydraulic cylinder, means for slidably mounting said cylinder on said machine, and a stationary piston cooperating with said cylinder for hydraulically reciprocating said cylinder.

References Cited

UNITED STATES PATENTS

| 3,074,147 | 1/1963 | Miller et al. | 77—25X |
| 3,406,607 | 10/1968 | Hill | 77—25X |
| 3,422,724 | 1/1969 | Zankl et al. | 77—25 |

FOREIGN PATENTS

| 1,491,020 | 6/1967 | France | 77—25 |

GIL WEIDENFELD, Primary Examiner

U.S. Cl. X.R.

77–25; 90—11

UNITED STATES PATENT OFFICE
CERTIFICATE OF CORRECTION

Patent No. 3,551,974            Dated January 5, 1971

Inventor(s) GUISEPPE FANTONI

It is certified that error appears in the above-identified patent and that said Letters Patent are hereby corrected as shown below:

Column 2, line 20, "IV-IV" should read -- III - III --.

Column 2, line 22, "V-IV" should read -- IV-IV --.

Column 3, line 54, after "tool carrier" a -- 19 -- should be inserted.

Signed and sealed this 14th day of March 1972.

(SEAL)
Attest:

EDWARD M. FLETCHER, JR.            ROBERT GOTTSCHALK
Attesting Officer                  Commissioner of Patents